(12) United States Patent
Rantala

(10) Patent No.: US 9,486,743 B2
(45) Date of Patent: Nov. 8, 2016

(54) APPARATUS AND METHOD FOR REMOVING FINELY DIVIDED SOLIDS FROM A LIQUID FLOW

(75) Inventor: Pertti Rantala, Espoo (FI)

(73) Assignee: SOFI FILTRATION OY, Espoo (FI)

( * ) Notice: Subject to any disclaimer, the term of this patent is extended or adjusted under 35 U.S.C. 154(b) by 567 days.

(21) Appl. No.: 13/983,661

(22) PCT Filed: Feb. 3, 2012

(86) PCT No.: PCT/FI2012/050103
§ 371 (c)(1),
(2), (4) Date: Nov. 6, 2013

(87) PCT Pub. No.: WO2012/104493
PCT Pub. Date: Aug. 9, 2012

(65) Prior Publication Data
US 2014/0054226 A1    Feb. 27, 2014

(30) Foreign Application Priority Data

Feb. 4, 2011    (FI) .................................... 20115113

(51) Int. Cl.
*B01D 65/08*    (2006.01)
*B01D 61/14*    (2006.01)
*B01D 63/06*    (2006.01)

(52) U.S. Cl.
CPC ............. *B01D 65/08* (2013.01); *B01D 61/14* (2013.01); *B01D 63/065* (2013.01); *B01D 2315/10* (2013.01)

(58) Field of Classification Search
CPC .... B01D 65/08; B01D 61/14; B01D 63/065; B01D 2315/10
See application file for complete search history.

(56) References Cited

U.S. PATENT DOCUMENTS

| 3,245,541 | A | 4/1966 | Silverwateer |
| 5,500,134 | A | 3/1996 | Chahine |
| 6,251,294 | B1 | 6/2001 | Davis et al. |
| 6,461,513 | B1 * | 10/2002 | Jen ................. B01D 63/06 210/323.2 |
| 8,069,989 | B1 | 12/2011 | Gordon |
| 2006/0283815 | A1 | 12/2006 | Wieczorek |

FOREIGN PATENT DOCUMENTS

| DE | 102009034720 A | 1/2011 |
| EP | 1 044 713 A1 | 10/2000 |
| EP | 1 674 149 A1 | 6/2006 |

(Continued)

OTHER PUBLICATIONS

International Search Report, dated May 7, 2012, from corresponding PCT application.

*Primary Examiner* — John Kim
(74) *Attorney, Agent, or Firm* — Young & Thompson

(57) ABSTRACT

Apparatus (8) for filtering, clarifying or polishing, a liquid flow containing finely divided solids. In the apparatus (8), the liquid flow to be filtered is directed to the outer surface of a filter element (3) with high speed and in tangential direction, and thereby, influenced by the generated shearing force, part of the liquid penetrates the filter element (3) and is filtered. More precisely, the apparatus (8) includes a cross-flow tube (2) having a circular cylindrical shape and having apertures directed substantially in tangential direction towards the outer surface of the filter element (3). A method for removing finely divided solids from a liquid flow using such apparatus is also described.

13 Claims, 3 Drawing Sheets

(56) References Cited

FOREIGN PATENT DOCUMENTS

| FI | 106614 | B1 | 4/2000 |
| IL | 53615 | A | 3/1988 |
| WO | 01/89669 | A2 | 11/2001 |
| WO | 2009/152931 | A2 | 12/2009 |

\* cited by examiner

APPARATUS AND METHOD FOR REMOVING FINELY DIVIDED SOLIDS FROM A LIQUID FLOW

TECHNICAL FIELD

The present invention relates to an apparatus for filtering, i.e. for clarifying or polishing, a liquid flow containing finely divided solids. In this apparatus, the liquid flow to be filtered is directed to the outer surface of a filter element with high speed and in tangential direction, and thereby, influenced by the generated shearing force, part of the liquid penetrates the filter element and is filtered. The invention also relates to a method for removing finely divided solids from a liquid flow.

PRIOR ART

Clarification filtering or liquid polishing refers to removing finely divided solids from a liquid flow. Particularly it concerns liquids, where the amount of solids compared to the amount of the liquid to be filtered is small (from 0.1 mg/l to 10 g/l) and where also the particle size of the solids is very small (from 0.1 to 50 μm). This has traditionally been an especially difficult range for filtering. Clarification filtering is used for example in mining and processing industries and in food and pharmaceutical industries. In addition, for example in pretreatment of ballast water of ships and in production of clean water, the clarification filtering is applicable. In a wider sense, in all fields where water or any liquid with corresponding viscosity is treated, there can arise a need to filter the finely divided solid material away from the liquid flow.

There are numerous different clarification filters on the market. For example, there are devices that are based on a filter cartridge or bag, where the liquid is forced with high pressure through the filter, whereby the solid material remains in the filter material. Devices of this type are very simple and their cost of acquisition is low, but they require continuous maintenance, and additionally, the filters are easily clogged and often need to be replaced. Thus, the service and maintenance costs of these kinds of filters are high.

Cross-flow filtration is one clarification filtration method. In cross-flow filtration, most of the liquid to be fed, containing finely divided material (i.e. feed flow) goes tangentially across the surface of the filter element, in other words, not perpendicular to the filter. An advantage of this method is that the filter cake building up, that generally speaking clogs the filter element, is substantially flushed away during the filtering process, thus extending notably the operational life time of the filter element.

A method and an apparatus operating based on the cross-flow filtration principle are disclosed in patent publication FI 106 614. In this method, the filter element is brought to rotational movement and the liquid flow to be filtered is fed to the outside of the filter element in a direction substantially opposed to the direction of movement of the mantle surface, the liquid being filtered through the element mantle to the inside of the element. Due to the rotating filter element, the construction of the apparatus implementing the method is very complicated and thus expensive. The filter apparatus according to the patent is marketed under the trade name CERTUS® (Filtermat Oy).

The filtering device of the present invention utilizing the cross flow has a simple construction and, as a result, it is inexpensive to manufacture. In addition, in the device in accordance with the invention, the liquid to be filtered hits the outer surface of the filter element with an adequate speed and tangentially over the total cylindrical surface of the element, whereby efficient filtering is guaranteed. With the device construction according to the invention, pressure losses of the filtering are also minimized, which substantially reduces the energy consumption of the filtering process. In other words, the filtering apparatus in accordance with the invention has both low production and usage costs. In terms of capacity, the apparatus in accordance with the invention is better than its predecessors.

SHORT DESCRIPTION OF THE DRAWINGS

FIG. 1 FIG. 1 shows a cross-sectional view of one filter apparatus in accordance with the invention, along the longitudinal axis thereof.

FIG. 2A Correspondingly, FIG. 2A shows a horizontal cross-sectional view of the apparatus of FIG. 1.

DESCRIPTION OF THE INVENTION

The present invention relates to an apparatus for clarifying a liquid containing finely divided solids, the apparatus having a circular cylindrical shape and comprising at least one inlet connection for feeding liquid to be clarified into the apparatus, an outer mantle, a filter element, at least one outlet connection positioned substantially in an upper portion of the apparatus and at least one outlet connection positioned substantially in a lower portion of the apparatus, for arranging a liquid circulation, and means for feeding the liquid into the apparatus. Further, the apparatus comprises a cross-flow tube having a circular cylindrical shape and being positioned between the filter element and the outer mantle, substantially concentric with the filter element, said cross-flow tube having apertures directed substantially in tangential direction towards the outer surface of the filter element. Said apertures are provided substantially over the total length of the cross-flow tube and substantially around the total circumference thereof.

Further, the invention relates to a method for clarifying a liquid containing finely divided solids, the liquid to be clarified being in said method fed with a pressure to a mantle space of an apparatus, from where the liquid migrates towards a filter element and is filtered when passing through the filter element mantle to a filtrate space, to be drained out of the apparatus. The method in accordance with the invention is characterized in that the liquid to be clarified is directed to hit against the outer surface of the filter element substantially in tangential direction and with an adequate speed.

Figure 1:
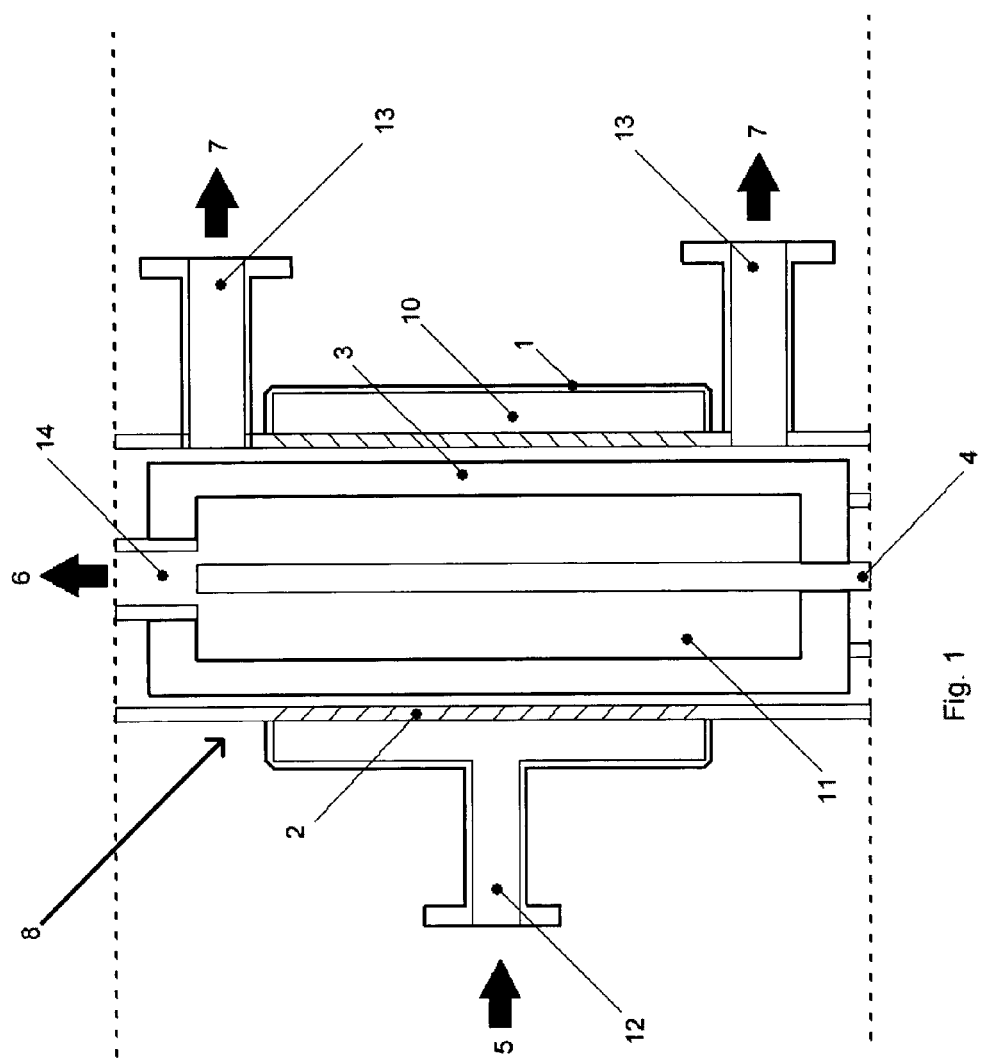

FIG. 1 shows one filter apparatus (8) according to the invention, comprising an outer mantle (1), a cross-flow tube 2 (CF-tube), a membrane, i.e. a filter element (3), and an ultrasonic device (4), as well as a mantle space (10) formed between the outer mantle and the CF-tube, a feed flow (5), in other words, the liquid to be clarified or polished, being led thereto. In addition, the apparatus comprises a filtrate space (11) inside the membrane (3), where the clarified liquid (6) migrates before being discharged via an outlet (14). In the case of FIG. 1, the liquid to be filtered is circulated by means of outlet pipes (13) located in the upper and lower ends of the apparatus (8), in order to maintain an adequate speed of the liquid hitting against the outer surface of the filter element (3). The apparatus in accordance with the invention has a cylindrical i.e. circular cylindrical shape.

Figure 3:
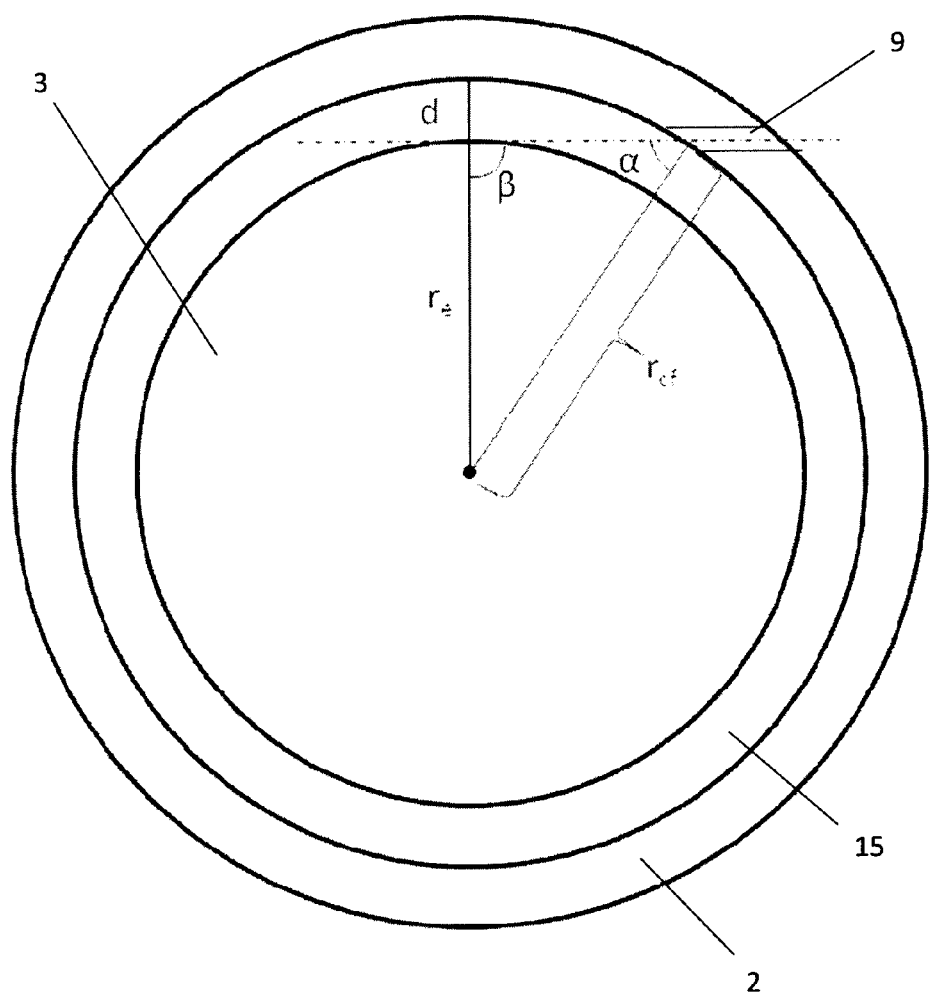
FIG. 3 is a schematic drawing as a cross-sectional circle of the filter element and the cross-flow tube (not in scale).

The cross-flow tube (2) is located around the filter element (3) so that there is a gap (15) between the inner surface of the CF-tube (2) and the outer surface of the filter element (3), the gap having a width of 3 to 15 mm, preferably from 3 to 8 mm. The recent developments in the manufacturing technique of the components of the filter apparatus enable that the distance between the inner surface of the CF-tube (2) and the outer surface of the filter element (3) can be as short as 1 mm. Thus, the gap (15) between the inner surface of the CF-tube (2) and the outer surface of the filter element (3) can be between 1 mm and 15 mm, most preferably it is between 1 mm and 5 mm. FIG. 3 shows a schematic view, not in scale, of the cross-section of the inner structure of the filter apparatus (8), from the cross-flow tube (2) inwards. The filter element (3) and the CF-tube (2) are structures having a cylindrical shape, substantially located coaxially, but with different diameters. The wall thickness of the CF-tube can range from 1 to 10 mm.

Figure 2:
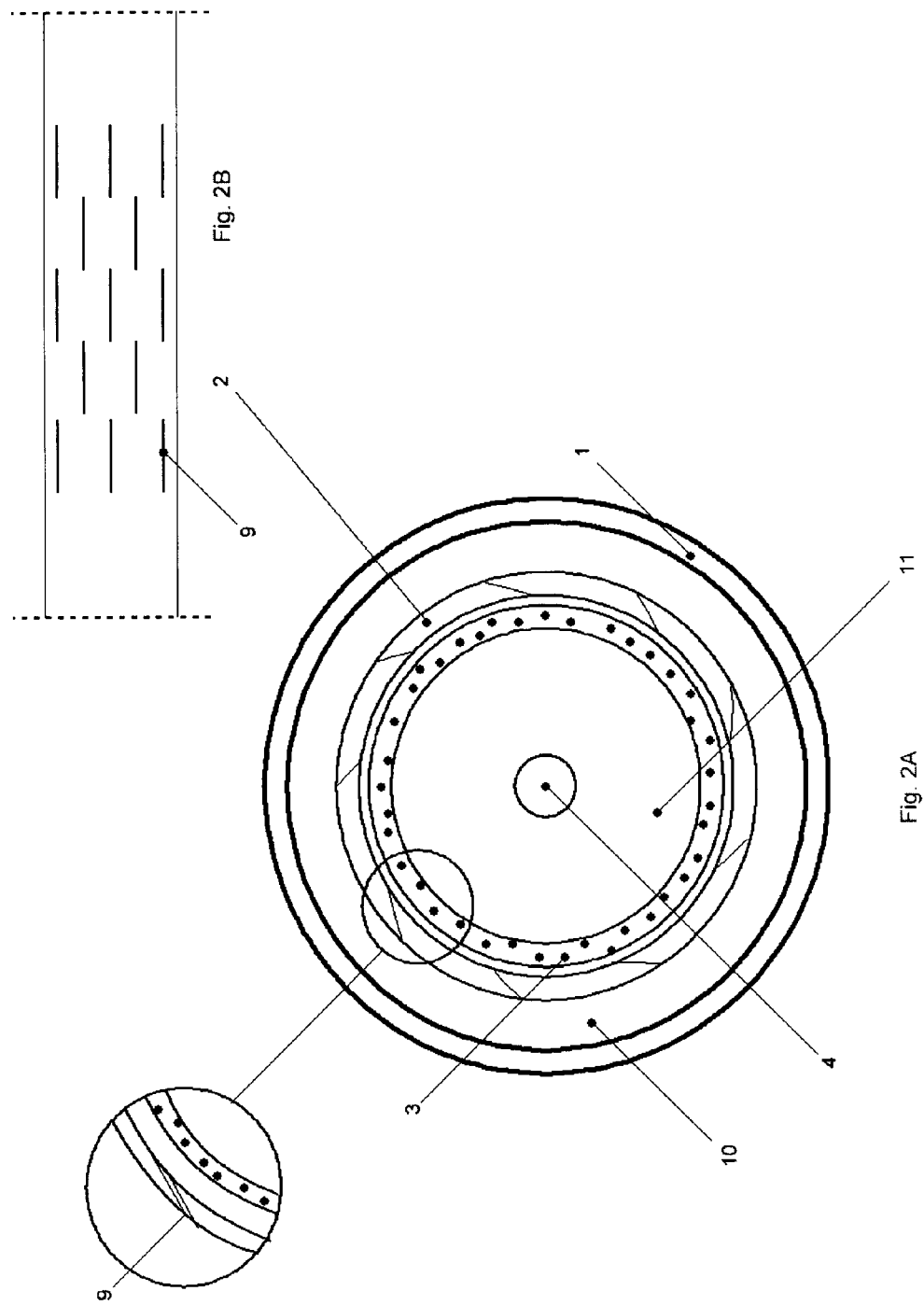
FIG. 2B is a schematic drawing of a cross-flow tube in accordance with the invention, and specifically of the layout of the apertures worked on the tube.

The cross-flow tube (2) is provided with rectangular apertures (9), made for example with laser, directed substantially in a tangential direction with respect to the outer surface of the filter element (3). FIG. 2A shows as a schematic view the direction of the apertures (9) and their position on the circumference of the tube (2). The width of the apertures (9) or "incisions" (9) can range from 0.1 mm to 5 mm; preferably it is from 0.3 to 2 mm. The height of the apertures (9) ranges from 1 mm to 150 mm; preferably the height is from 40 to 80 mm. In accordance with one embodiment, all apertures (9) of the CF-tube (2) are substantially of the same size. According to the invention it is, however, possible to provide the CF-tube of the filter apparatus (8) with apertures (9) of different sizes, having for example apertures of two or three different sizes. The height and width dimensions are defined as viewed in the direction of the longitudinal axis of the CF-tube. Apertures (9) as described above are provided in the CF-tube (2) substantially over the total length and around the total circumference thereof. More precisely, there are apertures (9) over the length of the CF-tube for the part that surrounds the filter element (3). FIG. 2B shows as an example one layout of the apertures of the CF-tube.

According to the invention, the CF-tube (2) directs the liquid (5) to be clarified to the outer surface of the filter element (3) substantially in a tangential direction over the total cylindrical area of the element, both in the longitudinal and circumferential directions. In addition, the speed of the liquid flow increases when it passes through the short channels formed by the apertures (9). According to the invention, there is new liquid to be filtered hitting against the outer surface of the filter element (3) continuously and with an adequate speed. Preferably all the apertures (9) of the tube (2) are directed so that the liquid to be clarified hits against the outer surface of the filter element (3) substantially in parallel direction. In other words, the liquid moves in the gap between the element (3) and the tube (2) in the same direction.

FIG. 3 illustrates directing of one aperture (9), and thus of the liquid to be clarified tangentially at angle $\alpha$ towards the outer surface of the filter element. The direction of the aperture is tangential when the angle $\beta$ is 90°. According to the invention, the liquid to be clarified is directed to the outer surface of the filter element (3) substantially in tangential direction by means of the apertures (9) of the cross-flow tube (2), whereby the angle $\beta$ can be between 90° and 110°, advantageously it is, however, approximately 90°. FIG. 3 shows the radius ($r_e$) of the filter element (3) and the radius ($r_{cf}$) of the cross-flow tube (2), as well as the width (d) of the gap (15) between the element and the tube, which can, accordingly, range from 3 to 15 mm. Preferably the width (d) of the gap (15) between the element and the tube is between 1 and 15 mm, most preferably it is 1-5 mm. The radius ($r_{cf}$) of the cross-flow tube (2) is the perpendicular distance from the inner surface of the tube to the center point of the cross-section. The degree of angle $\alpha$ is defined based on the degree of angle $\beta$ and the width (d) of the gap (15). According to the invention there are apertures (9) on the total circumference of the CF-tube at defined distances. FIG. 3 is not in scale, and in it only one aperture (9) is shown.

In the case of FIG. 3, the aperture (9) is substantially equal in size along the total length, in other words, along the thickness of the wall of the cross-flow tube (2). According to the invention, however, it is possible that the apertures (9) of the tube or at least a part of them are tapering towards the inner wall of the CF-tube (2), whereby tapered channels are provided. The area of the aperture (9) defined by the width and the height of the aperture (9) can reduce along the thickness of the wall at most to the half of that on the outer wall of the CE-tube (2), in other words, the area of the aperture on the inner wall of the CF-tube is at least 50% of the area of the aperture on the outer wall of the CF-tube. The tapering can be implemented in the lateral and/or vertical directions of the aperture.

Viewed in the longitudinal direction of the filter apparatus (8), the apertures (9) are preferably directed horizontally towards the outer surface of the filter element (3). It is, however, also possible that the direction of the apertures (9) deviates from this horizontal direction either sloping upwards or downwards. In FIG. 1, the stripes in the CF-tube (2) only illustratively show the apertures in the tube (2); their direction does not correspond to the reality.

As viewed from the cross-sectional circle, the apertures (9) are positioned on the circumference of the CF-tube (2) preferably at distances of 10° to 50° and most preferably at distances of 15° to 30°. As mentioned above, viewed in the direction of the longitudinal axis of the apparatus (8), there are apertures (9) provided substantially over the total length of the CF-tube (2) in one row or in a plurality of rows, preferably in a plurality of rows. As used herein, "row" or "row of apertures" refers to a series formed by adjacent apertures around the circumference of the CF-tube (2). In the longitudinal direction of the CF-tube (2), the rows of apertures are located sequentially. Thus, FIG. 2B shows five rows of apertures sequentially. Preferably the apertures (9) of the sequential rows are located between each other, most preferably substantially in the middle, as shown in FIG. 2B. The apertures of the sequential rows can be located partly staggered, whereby there is one or a plurality of areas having apertures with a higher density. On the other hand, it is possible that there is an area or a plurality of areas with no apertures, left between the rows of the apertures.

Around the CF-tube (2), in the mantle space (10) left between the CF-tube and the outer mantle (1), the incoming liquid (5) is fed through one or a plurality of points. The amount of inlet connections (12) can be from 1 to 20, preferably from 2 to 8. In the example of FIG. 1, there is shown one feed inlet (12). Most preferably the feeding is effected at three points, whereby the feeding pipes are located in vertical direction so that there is a pipe in both ends of the apparatus (8) and one substantially in the middle. In the case of three feed inlets (12), the inlets are located, viewed from the cross-sectional circle of the filter apparatus (8), at mutual distances of 100° to 140°, preferably from 110° to 130°. Most preferably the three feed inlets are located on the circumference of the cylinder at equal distances, whereby their distance is about 120°. A person skilled in the art is able to determine the amount and positions of the feed inlets (12) required by the apparatus (8), as well as the size and shape of the inlet pipe or pipes (12) appropriately, taking into account the application and circumstances of use of the filter apparatus (8). The inlet pipe (12) can have for example a round cross-sectional shape. According to the invention, the feeding can also be implemented as a so called slot-feed, whereby the liquid is fed through a slot formed between two sheets and rubber lips attached thereto. The feed inlet or feed inlets (12) are preferably directed substantially in tangential direction towards the outer surface of the cross-flow tube (2), so that the direction of movement of the liquid to be clarified is the same in the mantle space as in the gap between the filter element (3) and the CF-tube (2).

The distance between the inner surface of the outer mantle (1) and the outer surface of the CF-tube (2) has no substantial influence on the operation of the apparatus, and thus, it can be defined as appropriate for the intended use. Preferably, the distance between the inner surface of the outer mantle (1) and the outer surface of the CF-tube (2) is from 10 to 200 mm, more preferably from 30 to 100 mm.

As a filter element (3) of the filter apparatus (8), it is possible to use commercially available elements made of porous material, such as ceramic or silicon carbide elements. The filter element can also be made of sintered metal or sintered metallic mesh. Commercial trademarks include for example GKN and Bopp. The pore size of the filter element is from 0.1-50 microns. The diameter of the filter element is usually from 60 mm to 400 mm. Respectively, the length of the element is in general from 250 mm to 1 000 mm. It is possible to build up a plurality of filter elements on top of each other. In that case it is said that the filter element comprises a plurality of filter element units.

In addition, the filter apparatus (8) comprises two or more outlet connections (13) for circulating the liquid to be clarified. In that way the speed of the liquid moving on the outer surface of the filter element (3) can constantly be kept high. Preferably the outlets (13) are located so that at least one of them is substantially in the upper part of the apparatus (8) and at least one is substantially in the lower part of the apparatus. In this case, "substantially in the upper part" means above the midpoint in the longitudinal direction of the apparatus, and respectively, "substantially in the lower part" means the part below the midpoint in the longitudinal direction of the apparatus. In the case of two outlet connections, they are preferably located as far as possible from each other in the longitudinal direction of the apparatus, in other words, one at the upper end of the apparatus and the other at the lower end of the apparatus, however, substantially perpendicular to the vertical axis of the apparatus (8). In that case the liquid circulation of the apparatus (8) is "open-ended", so that the liquid circulation does not stop at any stage. Depending on the size or purpose of use or other application constraints for the apparatus (8), there can even be more outlets (13) than two. If the filter element (3) of the filter apparatus comprises a plurality of filter element units on top of each other, the outlets (13) are preferably located at the connection points and at both ends of the apparatus.

The liquid (7) discharging through the outlets is led to the feed flow (5) of the apparatus to be returned into the apparatus. This forms a so called circulation loop (retentate circulation) that maintains the speed of the liquid. Usually, the feed and the liquid circulation are arranged to operate with one pump. FIG. 1 shows a filter apparatus (8) having two outlet connections (13). Positions of the outlets (13) in the longitudinal and cross-sectional directions of the apparatus (8) depend on the respective application.

Outlet connection (14) for the clarified filtrate (6) is located either at the upper or lower end of the apparatus (8), for example parallel with the vertical axis of the apparatus (8). In the case of FIG. 1, the filtrate (6) is discharged from the upper end of the apparatus, whereby an ultrasonic element is mounted to the lower end of the apparatus. It is possible, however, to discharge the filtrate through the lower end of the apparatus. In that case the ultrasonic element is located in the upper end.

In the apparatus (8), inside the filter element (3), there is a rod-like ultrasonic element (4) used for purifying the filter element. Preferably the ultrasonic element is not located precisely on the center line of the apparatus (8), but a couple of millimeters aside, to avoid the attenuation of the wave motion caused by the symmetry.

The size of the filter apparatus (8) in accordance with the invention, both its length and diameter and the mutual ratio of the same, can vary a lot depending on the application. Filter apparatuses (8) can be applied for example in laboratory scale or on the other hand, at industrial plants requiring a large size. One constraint related to the size of the filter apparatus (8) is the filter element (3), which is available in different sizes, as mentioned above. In practice, the maximum height of the filter element (8) is 3 meters, whereby the filter element consists of at least three filter element units located on top of each other.

The apparatus in accordance with the invention has been defined and described above in a vertical arrangement, but all dimensions and determinations stated herein are also valid in case the apparatus will be located in horizontal direction.

The filter (8) is fed with liquid to be clarified under a pressure that is between 1 and 10 bars; preferably the feed pressure is from 2 to 5 bars. A common, commercially available pump can be used for the feed. The liquid spreads from the inlet (12) or from a plurality of those inside the apparatus, first to the mantle space (10) and when it is filling up, the liquid starts to migrate through the apertures (9) of the cross-flow tube (2) towards the outer surface of the filter element (3). The feed pressure causes a pressure of 1 to 10 bars, preferably from 2 to 5 bars inside the apparatus, pushing the liquid to be clarified through the apertures (9) of the CF-tube. As the apertures (9) are very narrow and the pressure relatively high, the speed of the liquid increases considerably when passing through the aperture (9). Due to the tangential alignment of the apertures (9), the liquid hits to the outer surface of the filter element (3) in tangential direction, in other words, touching it tangentially. Thereby, due to the fast movement of the liquid, a shearing force is formed between the surface of the membrane (3) and the liquid, making a part of the liquid pass through the filter element (3); this is called a Cross-flow phenomenon.

By means of an arrangement in accordance with the invention, the liquid moving on the outer surface of the filter element (3) is hit by new liquid coming from the apertures (9) of the CF-tube. This causes between the outer surface of the filter element (3) and the inner surface of the CF-tube (2) turbulence, where the liquid moves with a very high speed. In the context of the present invention the term "turbulence" means that the liquid moves around the circle-cylindrical filter element (3). A "centrifugal force", in other words, tangential acceleration directed at the liquid in a circulating motion is in the solution in accordance with the invention not able to move liquid from the inner periphery towards the outer periphery, because firstly, there is a higher pressure at the outer periphery, and secondly, new liquid is constantly coming in from the outer periphery. Thus, with the filter apparatus (8) in accordance with the present invention, high liquid speeds can be reached, providing a strong cross-flow phenomenon and an excellent filtering efficiency. Compared with the Certus® filter, from 5 to 10 times higher speeds can be claimed. With the filter apparatus in accordance with the invention, for example speeds more than 10 m/s have been reached with a feed pressure of 2 bars.

Even though the liquid moving quickly on the surface of the filter element constantly purifies the filter element (3), it still must be washable for maintaining a good filtering efficiency of the apparatus. In the purifying cycle, the so called backwash, the filtrate (6) filtered by the apparatus is led with high power back to the apparatus, for example by means of compressed air or a pump. Feed of the liquid to be clarified is interrupted for the duration of the purification operation. At the same time the ultrasonic device (4) inside the apparatus is started. The surface of the filter element (3) is cavitated by ultrasound (4) simultaneously when being flushed from inside outwards with the filtrate (6.) Thus, the filter element (3) can be effectively purified. The purifying system can be constructed to be completely automatic, to monitor the feed and discharge pressures. When the pressure difference reaches the set limit, the apparatus drives the purification cycle automatically.

The invention claimed is:

1. An apparatus (8) for clarifying liquid containing finely divided solids, said apparatus (8) having a circular cylindrical shape and comprising:
    at least one feed inlet (12) for feeding the liquid to be clarified into the apparatus (8),
    an outer mantle (1),
    a filter element (3),
    at least one outlet (13) at the upper part of said apparatus (8) and at least one outlet (13) at the lower part of said apparatus for arranging liquid retentate circulation,
    an outlet for draining filtrate out of the apparatus (8), and
    a circular cylindrical shaped cross-flow tube (2) between the filter element (3) and the outer mantle (1) positioned coaxially with the filter element (3), said cross-flow tube (2) having apertures (9) directed substantially in tangential direction towards the outer surface of the filter element (3),
    wherein said apertures (9) are provided over the length of the crossflow tube (2) and around the circumference thereof, and have a length in the axial direction of the crossflow tube of 1 to 150 mm and a width in the circumferential direction of the crossflow tube of 0.1 to 5 mm, with the length exceeding the width.

2. An apparatus (8) according to claim 1, wherein said apertures (9) are in the longitudinal direction of the cross-flow tube (2) positioned at least in two rows.

3. An apparatus (8) according to claim 2, wherein the apertures (9) of sequential rows are positioned between each other.

4. An apparatus (8) according to claim 1, wherein said apertures (9) around the circumference of the cross-flow tube (2) are positioned at distances of 10° to 50°.

5. An apparatus (8) according to claim 1, wherein the wall, thickness of the cross-flow tube (2) is from 1 to 10 mm.

6. An apparatus (8) according to claim 1, wherein the apparatus further comprises an ultrasonic device (4) for cleaning the filter element (3) when necessary.

7. An apparatus (8) according to claim 1, wherein the gap between the outer surface of the filter element (3) and the inner surface of said cross-flow tube (2) has a width of 1 to 15 mm.

8. An apparatus (8) according to claim 7, wherein the gap between the outer surface of the filter element (3) and the inner surface of said cross-flow tube (2) has a width of 1 mm to 5 mm.

9. An apparatus (8) according to claim 1, wherein said apertures (9) are directed in tangential direction towards the outer surface of the filter element (3) in parallel so that the liquid moves in the same direction in the gap between the filter element (3) and the cross-flow tube (2).

10. An apparatus (8) according to claim 2, wherein said apertures (9) around the circumference of the cross-flow tube (2) are positioned at distances of 10° to 50°.

11. An apparatus (8) according to claim 3, wherein said apertures (9) around the circumference of the cross-flow tube (2) are positioned at distances of 10° to 50°.

12. A method for clarifying liquid containing finely divided solids by use of the apparatus according to claim 1, the liquid to be clarified in said method being fed under pressure to a mantle space (10) of an apparatus, from where the liquid migrates towards the filter element (3), and is filtered when migrating through the filter element (3) to a filtrate space (11), from where the clarified liquid (6) is led out of the apparatus (8), wherein the liquid to be clarified is directed to hit substantially in a tangential direction towards the outer surface of the filter element (3) and wherein the liquid circulates through the at least one outlet (13) at the upper part of said apparatus (8) and at least one outlet (13) at the lower part of said apparatus.

13. A method in accordance with claim 12, wherein the liquid (5) to be clarified is fed to the apparatus with a pressure of 1 to 10 bars.

* * * * *